United States Patent
Sinatov

(10) Patent No.: US 10,634,013 B2
(45) Date of Patent: Apr. 28, 2020

(54) METHOD FOR LIQUID AIR ENERGY STORAGE WITH SEMI-CLOSED $CO_2$ BOTTOMING CYCLE

(71) Applicant: Stanislav Sinatov, Kiryat-Ono (IL)

(72) Inventor: Stanislav Sinatov, Kiryat-Ono (IL)

( * ) Notice: Subject to any disclaimer, the term of this patent is extended or adjusted under 35 U.S.C. 154(b) by 113 days.

(21) Appl. No.: 16/121,656

(22) Filed: Sep. 5, 2018

(65) Prior Publication Data

US 2019/0072007 A1 Mar. 7, 2019

Related U.S. Application Data

(60) Provisional application No. 62/554,053, filed on Sep. 5, 2017.

(51) Int. Cl.
*F01K 27/00* (2006.01)
*F25J 1/00* (2006.01)
(Continued)

(52) U.S. Cl.
CPC ............ *F01K 27/00* (2013.01); *B01D 53/002* (2013.01); *B01D 53/265* (2013.01); *F01K 13/00* (2013.01);
(Continued)

(58) Field of Classification Search
CPC ... Y02E 60/15; F02C 6/16; F02C 1/08; F05D 2210/10; F05D 2210/12; F05D 2210/13;
(Continued)

(56) References Cited

U.S. PATENT DOCUMENTS 5,724,805 A * 3/1998 Golomb ................ F01K 23/106
60/39.12
7,821,158 B2 * 10/2010 Vandor ................. F01D 15/005
307/64
(Continued)

FOREIGN PATENT DOCUMENTS

| FR | 2489411 A1 | 3/1982 |
| WO | 2014000882 A2 | 1/2014 |
| WO | 2015138817 A1 | 9/2015 |

OTHER PUBLICATIONS

Carbon Pollution Standard Final Rule, 152 pp., Federal Register, Oct. 23, 2015.

*Primary Examiner* — Mark A Laurenzi
*Assistant Examiner* — Xiaoting Hu

(57) ABSTRACT

A proposed method provides a highly efficient fueled power output augmentation of the liquid air energy storage (LAES) through its integration with the semi-closed $CO_2$ bottoming cycle. It combines the production of liquid air in air liquefier during LAES charge using excessive power from the grid and an effective recovery of stored air for production of on-demand power in the fueled supercharged reciprocating internal combustion engine (ICE) and associated expanders of the power block during LAES discharge. A cold thermal energy of liquid air being re-gasified is recovered for cryogenic capturing most of $CO_2$ emissions from the facility exhaust with following use of the captured $CO_2$ in the semi-closed bottoming cycle, resulting in enhancement of total LAES facility discharge power output and suppressing the thermal NOx formation in the ICE.

5 Claims, 1 Drawing Sheet

(51) Int. Cl.

| | |
|---|---|
| *F25J 1/02* | (2006.01) |
| *F02C 6/16* | (2006.01) |
| *F02C 1/08* | (2006.01) |
| *B01D 53/26* | (2006.01) |
| *B01D 53/00* | (2006.01) |
| *F01K 25/10* | (2006.01) |
| *F01K 13/00* | (2006.01) |
| *F01K 23/10* | (2006.01) |
| *F17C 9/04* | (2006.01) |
| *F01K 23/06* | (2006.01) |

(52) U.S. Cl.
CPC ............... *F01K 23/10* (2013.01); *F02C 1/08* (2013.01); *F02C 6/16* (2013.01); *F17C 9/04* (2013.01); *F25J 1/0012* (2013.01); *F25J 1/0027* (2013.01); *F25J 1/0035* (2013.01); *F25J 1/0042* (2013.01); *F25J 1/0242* (2013.01); *B01D 2257/504* (2013.01); *B01D 2257/80* (2013.01); *B01D 2258/0283* (2013.01); *F01K 23/065* (2013.01); *F01K 23/103* (2013.01); *F01K 25/103* (2013.01); *F05D 2210/10* (2013.01); *F05D 2220/62* (2013.01); *F05D 2260/10* (2013.01); *F25J 2260/30* (2013.01); *F25J 2260/80* (2013.01)

(58) Field of Classification Search
CPC .. F05D 2220/62; F05D 2260/10; F01K 13/00; F01K 23/065; F01K 23/10; F01K 23/103; F01K 25/103; F01K 27/00; B01D 53/002; B01D 53/265; B01D 2257/504; B01D 2257/80; B01D 2258/0283; F17C 9/00; F17C 9/02; F17C 9/04; F17C 7/00; F17C 7/02; F17C 7/04; F25J 1/0012; F25J 1/0027; F25J 1/0035; F25J 1/0042; F25J 1/0242; F25J 2260/30; F25J 2260/80
See application file for complete search history.

(56) References Cited

U.S. PATENT DOCUMENTS

| | | | |
|---|---|---|---|
| 7,870,746 B2 * | 1/2011 | Vandor | F25J 1/0204 62/271 |
| 8,063,511 B2 * | 11/2011 | Vandor | F01D 15/005 307/64 |
| 9,638,068 B2 * | 5/2017 | Sinatov | F01K 27/00 |
| 2008/0216510 A1 * | 9/2008 | Vandor | F02C 6/16 62/600 |
| 2009/0282840 A1 | 11/2009 | Chen | |
| 2012/0151961 A1 * | 6/2012 | Ha | F17C 5/06 62/615 |
| 2012/0216520 A1 | 8/2012 | Chen | |
| 2012/0255312 A1 * | 10/2012 | Rajaraman | F01K 21/04 62/6 |
| 2014/0245756 A1 * | 9/2014 | Morgan | F02O 1/04 62/50.1 |
| 2015/0113940 A1 * | 4/2015 | Sinatov | F01K 3/02 60/39.182 |
| 2015/0184590 A1 * | 7/2015 | Conlon | F25J 1/0228 60/772 |
| 2015/0192065 A1 * | 7/2015 | Alekseev | F02C 6/16 60/772 |
| 2015/0226094 A1 * | 8/2015 | Alekseev | F25J 1/0228 60/772 |
| 2017/0016577 A1 * | 1/2017 | Sinatov | F01K 3/12 |
| 2017/0058768 A1 * | 3/2017 | Bergins | F01K 7/16 |
| 2018/0080379 A1 * | 3/2018 | Conlon | F01K 23/10 |
| 2018/0094550 A1 * | 4/2018 | Conlon | F02C 6/16 |
| 2018/0221807 A1 | 8/2018 | Sinatov | |
| 2018/0230904 A1 * | 8/2018 | Conlon | F01K 25/10 |

* cited by examiner

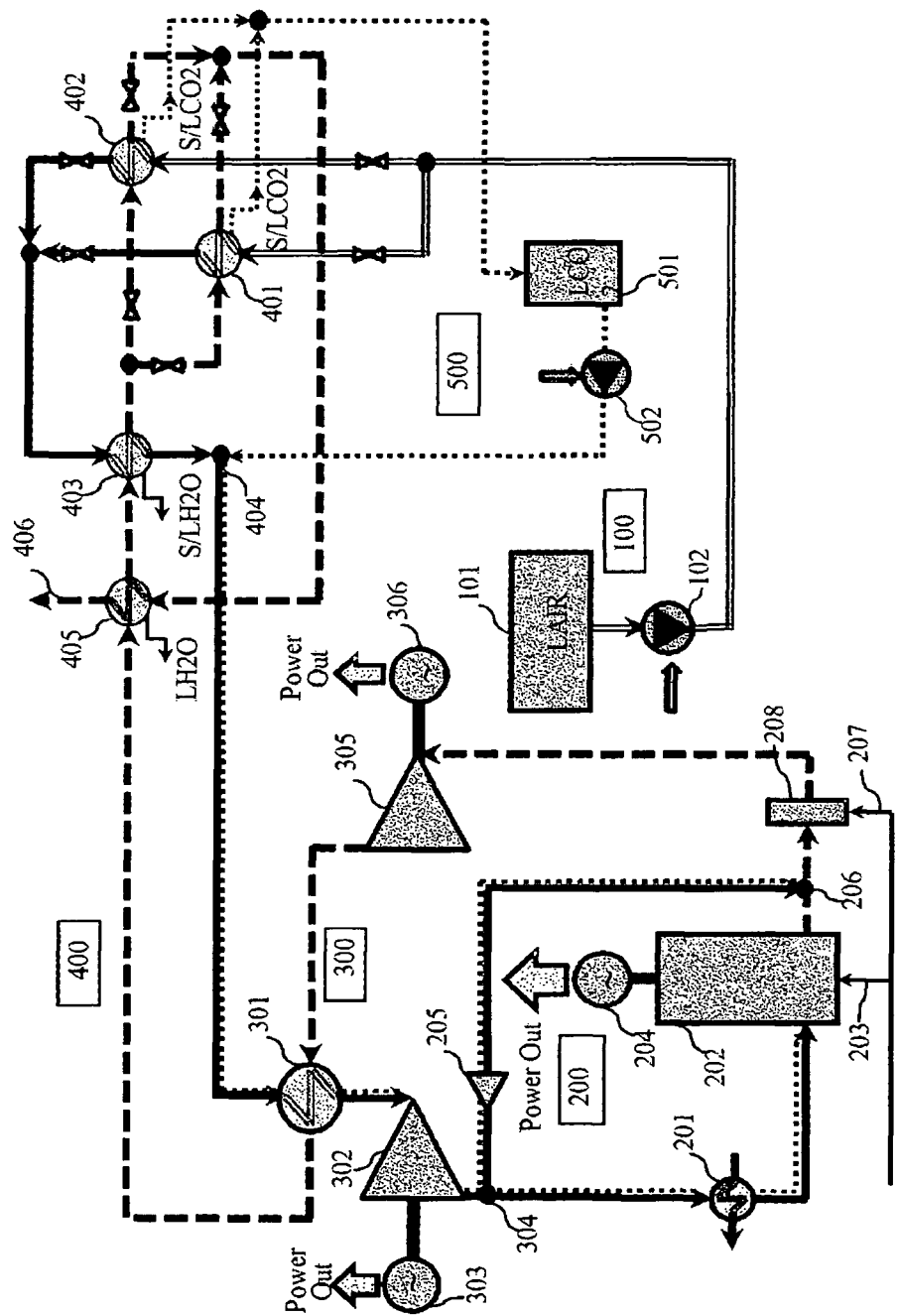

METHOD FOR LIQUID AIR ENERGY STORAGE WITH SEMI-CLOSED $CO_2$ BOTTOMING CYCLE

CROSS-REFERENCE TO RELATED APPLICATIONS

This application claims the benefits of U.S. Provisional Patent Application No. 62/554,053 titled "Method for Liquid Air Energy Storage with semi-closed $CO_2$ bottoming cycle" and filed on Sep. 5, 2017.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF INVENTION

The present invention relates to the field of energy conversion technique, and more specifically to the methods enabling an improvement in the technologies intended for conversion and storage of excessive energy in the electric grids. More particularly, the present invention relates to the methods making possible to provide a highly efficient fueled power augmentation of the liquid air energy storage simultaneously with a drastically reduced level of NOx and $CO_2$ emissions in its exhaust.

BACKGROUND OF THE INVENTION

In modern times the electrical energy storages are becoming an integral part of the distribution grids, ensuring the on-demand and reliable supply of electricity by the intermittent renewable energy sources (wind, solar) and providing a stable and efficient operation of the base-load fossil-fuel-fired and nuclear power plants around the clock.

Amongst the known methods for energy storage able to accumulate a lot of excessive energy and store it over a long time-period, the recently proposed methods for Liquid Air Energy Storage (LAES) (see e.c. Patent FR 2,489,411, US patent Application 2012/0216520 and WO Patent Application 2015/138817) are distinguished by a much simpler permitting process and the freedom from any geographical, land and environmental constraints, inherent in other known methods for large-scale energy storage technologies, like Pumped Hydro Electric Storage (PHES) and Compressed Air Energy Storage (CAES). In the LAES systems liquid air is produced using excessive power directly from the renewable energy sources or from the grid, stored in the small volume tanks between the off-peak and on-peak hours and pumped, re-gasified and expanded with production of a peaking power in the periods of high power demand. However, producing a liquid air during off-peak hours is an energy intensive process and many technical solutions have been proposed to reduce the energy consumption during LAES charge, increase the energy release during LAES discharge and in this manner to improve the LAES round-trip efficiency.

One of the possible ways for increase in energy release during LAES discharge could be its co-location with the power plant existing or planned to be constructed and recovery a waste heat of power plant exhaust for increase in temperature of discharged air prior to and in the process of its expansion (see e.c. US Patent Applications 2009/282840). However this possibility may be realized only with the availability of such co-located power plant and at its exhaust temperature high enough for waste heat to recover. The another proposed method for augmentation of the LAES output power consists in use of discharged air as combustion air at the co-located gas turbine plant (see e.c. WO Patent Application 2014/000882). The latter method seems to be the least substantiated by reason of excessively high specific air consumption typical for the gas turbine prime mover. This air consumption exceeds that typical for the comparable in power reciprocating internal combustion engine by a factor 2-3, resulting in the attendant increase in charging power and a required volume of liquid air tank at the LAES facility.

Because of this the method for fueled augmentation of the discharged power of the LAES facility with use of a supercharged reciprocating engine is proposed in the published U.S. Patent Application No. 2018/0221807. This makes possible not only to increase the LAES discharge power by more than 45%, but to gain also the additional benefits, resulting from a simple and efficient recovery of engine exhaust energy.

This technical solution provides also zero carbon emitting LAES facility exhaust through recovering the cold thermal energy of discharged liquid air being regasified for cryogenic cooling the facility exhaust with capture and removal of all $CO_2$ emissions from the said exhaust. However, even without any cryogenic exhaust treatment, the principles built into design and operation of any LAES facility already in themselves provide a very low level of $CO_2$ emissions in engine exhaust, which is, for example, a half of upper limit on carbon emissions from the large stationary CC gas turbine power plants set up by the new U.S. Carbon Pollution Standard in 2015. This circumstance weakens a motivation of the end-users on harnessing the proposed method for cleaning the LAES facility exhaust. In addition, despite the general public concern by the problems of global warming, at the present time there are not a substantial active world $CO_2$ market and the much accessible ways for $CO_2$ sequestration, This creates the problems for the marketing the $CO_2$ produced. Therefore there is a need for such improvements in the discussed method, which could remedy its market entry problems of today through creation of an alternative way for internal using the most part of $CO_2$ cryogenically produced instead of its marketing or sequestration.

The basis for this alternative way is a finding, according to which the cold thermal energy of liquid air being regasified in the LAES system may be used for a partial cryogenic capture of $CO_2$ emissions at a rate much exceeding the rate of their formation in the fueled reciprocating engine. This opens up possibilities for recirculation of a captured part of $CO_2$ emissions to the engine inlet in mixture with the discharged regasified air and thus creation of the semi-closed $CO_2$ bottoming cycle. From operation of the LAES system with this bottoming cycle the following benefits may be gained: a) further increase in the LAES discharged power output, which is an initial goal of the basic invention being now improved; b) the said increase in power without use of an additional equipment, resulting in a marked decrease in the CAPEX of LAES facility; and c) a significant decrease in NOx emissions level at LAES facility exhaust, resulting from suppression of thermal NOx formation in the process of fuel combustion in the engine cylinders. The latter is achieved through replacement of a part of oxygen at the engine inlet by recirculating $CO_2$ component, having much higher heat capacity and thus reducing a gas temperature level in the engine cylinders. The impact of a proposed $CO_2$ recirculation on suppression of NOx formation is comparable to the impact of well-known exhaust gas recirculation (EGR), but the practical implementation of $CO_2$ recirculation is much simpler and cheaper.

By this means, the method for liquid air energy storage including its fueled power output augmentation with cryogenic treatment of the LAES facility exhaust is selected as a subject for the innovative improvements in the present invention. Thereby, a cryogenic capturing a part of $CO_2$ emissions and its use for further facility power augmentation and reduction in NOx emissions are found to be the proper ways for achievement of the invention's goals.

SUMMARY OF THE INVENTION

In one or more embodiments, a proposed method for liquid air energy storage (LAES) with semi-closed $CO_2$ bottoming cycle may comprise in combination: a) charging the energy storage with liquid air produced through consumption of an excessive power from the co-located renewable energy sources or from the grid; b) discharging the energy storage with on-demand producing and delivering a power to the grid through pumping and re-gasifying the stored air and its recovering in the multi-stage expander train and as combustion air for the fueled supercharged internal combustion engine (ICE); and c) recovering the cold thermal energy of discharged liquid air being regasified for cryogenic cooling the LAES facility exhaust with capturing and liquefying at least a part of $CO_2$ emissions formed by combustion of fuel in the said LAES facility.

The invented method may differ from the known through including the following processes in combination: a) pumping the said liquid $CO_2$ up to pressure somewhat exceeding a pressure of the pumped liquid air; b) injection of the pumped liquid $CO_2$ into a stream of re-gasified air, resulting in regasification of injected $CO_2$ and forming a mixed air-$CO_2$ stream; c) superheating the mixed air-$CO_2$ stream in the waste heat recuperator upstream of the high-pressure (HP) turbo-expander stage; d) recovering the superheated mixed air-$CO_2$ stream in the said HP expander installed upstream of said supercharged reciprocating ICE; e) dividing a full air-$CO_2$ mixed stream escaping the HP expander into a proportion of air-to-$CO_2$ amounts in the said stream; f) recovering the bulk of mixed air-CO2 stream for combustion of fuel in the said supercharged reciprocating ICE; g) releasing the exhaust gases from the said ICE at the enhanced pressure and temperature; h) delivering the rest of mixed air-CO2 stream through a pressure equalizer for the mixing with the exhaust gases escaping the said ICE; i) increasing a temperature of the formed gaseous mixture through controlled combusting an additional fuel in this mixture; j) recovering the mixed exhaust gases through their expanding in the low-pressure (LP) turbo-expander stage with recuperating the waste heat of mixed exhaust gases escaping the LP expander at a pressure near atmospheric for said superheating the mixed air-$CO_2$ stream upstream of the HP expander; k) multi-stage treating the mixed exhaust gases including their dewatering and deep cooling first by a stream of treated exhaust gases escaping the facility and then by a stream of re-gasified air prior to said its mixing with $CO_2$ stream; l) further cryogenic cooling the mixed exhaust gases by a stream of discharged liquid air, accompanied by regasifying a said liquid air and desublimating and separating at least a part of solid $CO_2$ component from the stream of treated mixed exhaust gases; m) periodical fusion of the separated solid $CO_2$ component under a pressure exceeding $CO_2$ triple point with use of available waste heat streams from the LAES facility; n) withdrawing and accumulating the separated $CO_2$ in liquid form prior to its said pumping and mixing with the re-gasified discharged air; and o) said recovering a cold thermal energy of treated exhaust gases for said dewatering and deep cooling the non-treated mixed gases and following removing the treated exhaust gases with a non-captured part of $CO_2$ emissions into atmosphere.

In one or more embodiments, a minimal amount of the liquid $CO_2$ mixed with the re-gasified air may be established at a level equal to amount of $CO_2$ formed by combustion of fuel in the LAES facility, whereas a maximum amount of said $CO_2$ mixed with air may not exceed a level, at which a concentration of oxygen in air-$CO_2$ mixture at the ICE inlet is achieving a minimal admissible value required for stable combusting a fuel in the said ICE.

In one or more embodiments, a maximum amount of the liquid $CO_2$ mixed with the re-gasified air may exceed a minimum amount of such $CO_2$ by a factor of 2.0-4.0 and preferably by a factor of 2.5-3.0.

In one or more embodiments, an amount of the liquid $CO_2$ mixed with the re-gasified air may be selected at a level providing a desirable suppressing the formation of NOx emissions in the ICE, but not exceeding a said maximum amount of such liquid $CO_2$.

Finally, in one or more embodiments, an amount of the liquid $CO_2$ mixed with the re-gasified air may be increased through enhancement in pressure of liquid air produced and stored during LAES charge.

BRIEF DESCRIPTION OF THE DRAWINGS

Embodiment will hereinafter be described in detail below with reference to the accompanying drawing, wherein lie reference numerals represent like elements. The accompanying drawing has not necessarily been drawn to scale.

FIG. 1 is a schematic view of the first embodiment for implementing the discharging the energy storage with cryogenic capturing at least a part of the $CO_2$ emissions from energy storage exhaust and their use in the semi-closed $CO_2$ bottoming cycle, according to the present invention.

DETAILED DESCRIPTION OF THE INVENTION

The practical realization of the invented method for Liquid Air Energy Storage (LAES) with semi-closed $CO_2$ bottoming cycle may be performed through the integration between the liquefier of LAES facility, fueled supercharged reciprocating internal combustion engine (ICE) with associated turbo-expanders package and system for exhaust gas treatment including cryogenic capture of a part of $CO_2$ emissions from facility exhaust with recovery of the captured $CO_2$ emissions in the said bottoming cycle. Such the integration makes possible to maximize power output and round-trip efficiency of the energy storage and to significantly suppress the formation of the thermal NOx emissions. The LAES operation includes the modes of its charge and discharge. The charge operation mode is identical to that described in the published U.S. Patent Application No. 2018/0221807 and therefore its detailed explanation is not needed here.

FIG. 1 shows schematically the first embodiment of the power block of LAES facility for implementing the discharge operation mode with semi-closed $CO_2$ bottoming cycle. Here the involved equipment packages are designated as:

- 100—liquid air storage equipment;
- 200—supercharged reciprocating ICE package;
- 300—expander train;
- 400—exhaust dewatering and cryogenic cooling package; and
- 500—bottoming cycle package.

Operation of the power block in discharge mode is performed as follows. A stream of liquid air is extracted from the storage 101 at a bottom dicharge cycle pressure exceeding 2 barA and pumped by a pump 102 up to top discharge cycle pressure selected in the range between 100 and 200 bar. The highly-pressurized liquid air stream is delivered into package 400, wherein its regasification is performed in one of two heat exchangers 401 and 402 operated by turns. The regasified air is further subjected to a moderate heating in heat exchanger 403 and mixed in the point 404 with a stream of pumped liquid $CO_2$, resulting in formation of highly-pressurized air-$CO_2$ mixed stream. A temperature of said mixed stream is further risen in the hot recuperator 301 up to level not exceeding 600° C. The said temperature restriction makes possible to use the commercially available back-pressure steam turbine as a high-pressure (HP) expander 302, wherein partial expanding the superheated air-$CO_2$ mixed stream is performed down to an intermediate discharge cycle pressure selected in the range from 2 up to 12 barA. The HP expander 302 is coupled with electric generator 303, converting mechanical work of expander into a part of the energy storage electrical output.

In the point 304 the air-$CO_2$ mixed stream escaping the expander 302 is divided into two parts. Most of the mixed stream is directed through the optional intercooler 201 to the fueled reciprocating internal combustion engine (ICE) 202 for its supercharging and combustion of fuel delivered into said ICE through pipe 203. This is accompanied by formation of the water ($H_2O$) vapor and additional gaseous carbon dioxide ($CO_2$) components in the stream of exhaust gases escaping the ICE under pressure slightly below a selected intermediate discharge cycle pressure. The said engine is loaded by the generator 204 and used to produce from 35 to 65% of total energy storage power output. A minor part of the air-$CO_2$ mixed stream escaping the expander 302 bypasses the ICE 202 and is directed through pressure equalizer 205 to the point 206, wherein its mixing with exhaust gases from engine 202 is performed.

A temperature of mixed exhaust gases stream and concentration of the said $H_2O$ and $CO_2$ components in this stream are further increased, resulting from combustion of a small amount of additional fuel delivered via pipe 207 into the duct burner 208 installed dowstream of the point 206. Amount of additional fuel consumed should be designed so that a stable combustion of this fuel and a temperature of the mixed exhaust stream at the outlet of said burner 208 not exceeding 750° C. would be ensured. The said restriction on the enhancement of the mixed exhaust stream temperature provides two necessary conditions for design and operation of the described scheme. On the one hand, it makes possible to use the commercially available power turbine produced by the engine manufacturer as low-pressure (LP) exhander 305 of this mixed exhaust stream, wherein its pressure is reduced down to a pressure slightly above the armospheric value. On the other hand, it provides the temperatures of mixed exhaust stream at the outlet of expander 305 and inlet of recuperator 301 in the range securing a temperature of superheated air-CO2 mixed stream at the outlet of said recuperator not exceeding 600° C. The generator 306 driven by LP expander 305 produces a part of energy storage power output.

A further treatment of mixed exhaust gases stream cooled in the recuperator 301 is destined for dewatering these gases and freeing them from most of the $CO_2$ components. The first step of gases dewatering may be a drainage of water condensate from the recuperator 301 through a coupled drainage device. In the following two-stage cooling process, the exhaust stream is cooled firstly in the first cooler 405 down to a temperature close to 1° C., resulting in further condensing the water vapor and its removal through a coupled drainage device. A succeeding cooling of the mixed exhaust gases down to −70° C.−−90° C. is performed in the second cooler 403, resulting in freezing the water component on the tubing surface of this cooler. Since a water vapor mass content in the mixed exhaust gas stream at the inlet of second cooler 403 does not exceed 0.4-0.7%, ice deposition on the tubing surface during energy storage discharge does not lead to a marked increase in pressure drop. This makes possible to postpone the ice removal until starting a process of the energy storage charge. During this process a compression heat from any air intercooler or aftercooler of compressor train may be used to melt the ice on the tubing surface of the cooler 403 with drainage of the formed liquid water through a coupled drainage device.

A final cryogenic cooling of dewatered mixed exhaust gases stream down to the temperature below −120° C. is performed in one of two heat exchangers 401 and 402 operated by turns and accompanied by de-sublimation of most of the $CO_2$ component and its deposition on the tubing surface of said heat exchangers in the form of dry ice. Since a mass $CO_2$ content in the dewatered mixed exhaust gas stream at the inlet of heat exchangers 401 and 402 lies in the range from 17 to 28%, solid $CO_2$ deposition on the tubing surface of these heat exchangers may lead to a marked increase in pressure drop of mixed exhaust gas stream. To exclude formation of intolerably thick layer of dry ice during energy storage discharge, the said heat exchangers are used in turn for de-sublimation of most of the $CO_2$ component and its removal in a liquid state. Whereas in one heat exchanger a cryogenic capture of $CO_2$ component from mixed exhaust gases stream is accompanied by formation of dry ice on its tubing surface, another heat exchanger is disconnected from the mixed exhaust gas duct and liquid air pipe and is freeing from the solid $CO_2$. The $CO_2$ is removed in liquid form into pressurized tank 501, for which purpose a shell of disconnected heat exchanger is pressurized up to pressure above critical value 5.2 barA and available waste heat stream from the LAES facility (for example, a stream of cooling water from the gas engine 202) is directed into tubing part of this heat exchanger to fuse the dry ice on the outer surface of tubing part and convert it directly into liquid $CO_2$.

It should be stressed that at a selected and fixed top discharge pressure of the pumped liquid air, its temperature at the at the inlet of heat exchangers 401 and 402 is directly dependent on a pressure and temperature of the liquid air produced, stored and delivered to suction of the pump 102. In its turn, for each given concentration of $CO_2$ in the mixed exhaust gas stream a temperature of liquid air at the inlet of heat exchangers 401 and 402 has a direct impact on a minimal level of the mixed exhaust gas temperature, which may be achieved at the outlet of said heat exchangers and consequently on a share of $CO_2$ desublimated in them. For example, at the given top discharge pressure of 140.6 barA a temperature of mixed exhaust gas temperature at the outlet of heat exchangers 401 and 402 may reach −181° C.--140° C. in the diapason of produced liquid air pressures from 2.7 to 14.7 barA. This makes possible to capture from 100 to 85% of the $CO_2$ emissions from the mixed exhaust gas stream without $CO_2$ recirculation.

The treated and deeply cooled exhaust gas with significantly reduced $CO_2$ content escapes the heat exchangers 401 and 402 and is delivered into first cooler 405, wherein its cold thermal energy is used for cooling and dewatering the un-treated mixed exhaust stream. Since a temperature of mixed exhaust stream escaping the cooler 405 is fixed at a level of about 1° C., a temperature of treated exhaust stream 406 is always below 0° C. This makes possible to use this exhaust stream as source of cold for the gas engine cooling system, or to accumulate this cold for following its usage for intercooling the pressurized air during LAES facility charge.

INDUSTRIAL APPLICABILITY

The comparative analysis of the LAES facility in three configurations is presented below: Alt. 1—without any post-combustion exhaust gases treatment; Alt. 2—with near-zeroth carbon emitting exhaust; and Alt. 3.—with semi-closed $CO_2$ bottoming cycle. The calculation of these performances has been performed as applied to integration between the air liquefier and power block, including a fueled supercharged reciprocating internal combustion engine (ICE) supplemented by duct burner (DB) installed downstream of gas engine and expander train with HP air expander installed upstream of ICE and LP exhaust expander installed downstream of the DB.

Using an excessive power of renewable energy sources, the air liquefier produces 15.1 kg/s of liquid air at a pressure of 6.7 barA during 12 off-peak hours. During 12 on-peak hours the stored liquid air is pumped up to 140.5 barA and converted into on-demand power in the power block with fueled augmentation. The ICE is exemplified by fueled gas engine designed for producing 9730 kW of electrical power at Heat Rate of 7779 kJ/kWh or 46.3% of electrical efficiency. In the Alt. 1 and 2 this standard engine is supercharged with 15.1 kg/s of pure regasified liquid air used as combustion air at the pressure of ~3.9 barA and temperature of 45° C. In the Alt. 3 the stream of pumped liquid $CO_2$ at a rate of 3.9 kg/s is mixed with the stream of HP regasified liquid air at a rate of 15.1 kg/s to form the stream of HP air-$CO_2$ mixture as a working medium of the semi-closed $CO_2$ bottoming cycle. The concentration of oxygen in this mixed stream is equal to 17.9% (v/v), which is significantly below the oxygen content of 21% (v/v) in pure air used for supercharging the GE in the Alt. 1 and 2. After superheating in the recuperator and partial expansion in the HP expander the mixed air-$CO_2$ stream is divided into two parts. The bulk of the mixed stream at a rate of 15.1 kg/s is used for supercharging the ICE, whereas a minor part bypasses the GE and combines with the GE exhaust only before the DB. The ICE and DB are supplied with a methaneous fuel, having heat of combustion at a rate of LHV=48632 kJ/kg. Reduced concentration of oxygen in the air-$CO_2$ mixture at the engine inlet in the Alt. 3 leads to significant suppression of NOx formation in the combustion of fuel in this engine. In all Alternatives the exhaust gases escape the GE at the pressure of ~3.6 barA and temperature of ~570° C., having in their composition the $CO_2$ and $H_2O$ components, as products of fuel combustion. Combusting an additional fuel in the duct burner leads to increase in temperature of exhaust gases up to 750-760° C. and to further changes in their flow-rate and composition. The additionally heated exhaust gases are expanded in the LP expander and cooled in the recuperator, after which they are removed into atmosphere in Alt. 1 or subjected to further treatment in the Alt. 2 and 3.

This treatment includes dewatering and cryogenic cooling of the facility exhaust gases. In the Alt. 2 the treatment process is finalized by cryogenic capture and removal of 98-99% of $CO_2$ emissions from LAES facility exhaust. In the Alt. 3 up to 72% of $CO_2$ component (~3.9 kg/s) may be cryogenically captured and recirculated to inlet of the power block. The rest of $CO_2$ components (~1.55 kg/s) are emitted into atmosphere at a level of $CO_2$ emissions from LAES facility without any post-combustion exhaust gases treatment. In so doing this specific level (248 kg/MWh for Alt. 3 and 274 kg/MWh for Alt. 1) is far less than permitted for the large gas-fired power plants established by the new 2015 U.S. Carbon Pollution Standard.

As confirmed by such leading OEM as Siemens, Alstom and MAN Energy Solutions, the commercially available back-pressure steam turbine may be used as the HP turbo-expander, wherein a pressure of superheated mixture of air and $CO_2$ is reduced from 140 barA down to ~4 barA (see FIG.). Thereby a temperature of said gaseous mixture at the inlet of this expander is maintained at a level of 550-560° C. The industrial expanders produced by the MDT or ABB Turbochargers may be used as the LP turbo-expander, wherein a temperature of mixed exhaust gases at the inlet of such expander is maintained at the admissible level of 760° C. The main calculated performance of the LAES facility during its operation in charge and three different alternative discharge modes are presented in the Table below.

As evident from the presented calculation results, the use of proposed semi-closed $CO_2$ bottoming cycle, wherein amount of recirculating $CO_2$ ranges up to ~25% of consumed liquid air, makes possible to increase the discharge power output of LAES facility by ~10% and to significantly reduce formation of thermal NOx emissions in gas engine. Both the effects could be further enhanced, if production and storage of liquid air would be performed at a lower pressure with corresponding decrease in temperature of HP liquid air being used for cryogenic $CO_2$ capture. However care must be exercised to avoid the reducing of $O_2$ concentration at the gas engine inlet below ~16% (v/v).

The use of semi-closed CO2 bottoming cycle provides also an enhancement of grid round-trip efficiency (RTE) of LAES facility from 118% up to 130% and recasted RTE from 71% up to 79%. At the identical duration of the facility charge and discharge, the grid RTE is determined as simple relationship between the LAES facility discharge power output and power consumed for facility charge. The recasted RTE is determined having regard to grid power equivalent of fuel consumed by the ICE and DB during facility discharge. Since the average grid fuel-to-power conversion efficiency does not exceed ~33%, through multiplying of this value by the total heat input in each Alternative a grid power equivalent of fuel consumed may be calculated. Then the recasted facility discharge power is determined through subtraction of the calculated grid power equivalent of fuel consumed from total facility discharge power. In its turn, the recasted RTE is calculated as relationship between the recasted facility discharge power and power consumed for facility charge.

It should be noted that the term "comprising" does not exclude other elements or steps and "a" or "an" do not exclude a plurality. It should also be noted that reference signs in the claims should not apparent to one of skill in the art that many changes and modifications can be effected to the above embodiments while remaining within the spirit and scope of the present invention.

| Parameters | Units | Alt. 1 | Alt. 2 | Alt. 3 |
|---|---|---|---|---|
| LAES charge duration | h/d | 12 | 12 | 12 |
| Charge power from RES | MWe | 17.28 | 17.28 | 17.28 |
| Production of liquid air | kg/s | 15.1 | 15.1 | 15.1 |
| Pressure of liquid air stored | barA | 6.7 | 6.7 | 6.7 |
| LAES discharge duration | h/d | 12 | 12 | 12 |
| Consumption of liquid air | kg/s | 15.1 | 15.1 | 15.1 |
| Pressure of liquid air pumped | barA | 140.5 | 140.5 | 140.5 |
| Temperature of HP liquid air | ° C. | 164.5 | 164.5 | 164.5 |
| Zero CO2 exhaust | | No | Yes | No |
| Semi-closed CO2 bottoming cycle | | No | No | Yes |
| CO2 content in untreated exhaust flow | kg/s | 1.55 | 1.55 | 5.45 |
| CO2 content in treated exhaust flow | kg/s | 1.55 | 0.025 | 1.55 |
| CO2 removal efficiency | % | 0 | 98.5 | 0 |
| CO2 recirculation | kg/s | 0 | 0 | 3.9 |
| Pure air flow at the GE inlet | kg/s | 15.1 | 15.1 | N/A |
| Air-O2 mixed flow at the GE inlet | kg/s | N/A | N/A | 15.1 |
| Bypass air-O2 mixed flow | kg/s | N/A | N/A | 3.9 |
| O2 concentration at the GE inlet | % (v/v) | 21 | 21 | 17.9 |
| O2 concentration at the DB inlet | % (v/v) | 10.1 | 10.1 | 8.7 |
| Heat input with fuel in GE | MWth | 21.01 | 21.01 | 21.01 |
| Heat input with fuel in DB | MWth | 3.62 | 3.62 | 6.08 |
| Total heat input with fuel | MWth | 24.63 | 24.63 | 27.09 |
| Grid power equivalent of fuel consumed | MWe | 8.13 | 8.13 | 8.94 |
| GE power output | MWe | 9.73 | 9.73 | 9.73 |
| HP expander power output | MWe | 7.09 | 7.09 | 8.60 |
| LP expander power output | MWe | 3.91 | 3.91 | 4.58 |
| Auxiliary power consumption | MWe | 0.36 | 0.36 | 0.38 |
| Total net power produced | MWe | 20.37 | 20.37 | 22.52 |
| A share of CO2 cycle in total power | % | 0 | 0 | 9.6 |
| Fuel-to-power conversion efficiency | % | 83 | 83 | 83 |
| LAES grid round-trip efficiency | % | 118 | 118 | 130 |
| LAES recasted round-trip efficiency | % | 71 | 71 | 79 |

What is claimed as new is:

1. A method for a liquid air energy storage (LAES) with a semi-closed $CO_2$ bottoming cycle comprising in combination:
   charging a LAES facility with a liquid air produced by consuming a low-demand power from a renewable energy source or from a grid;
   discharging the LAES facility through pumping the liquid air to provide a pumped liquid air, re-gasifying the pumped liquid air in a cold box of the LAES facility to recover a re-gasified air, and delivering the re-gasified air to a multi-stage expander train and as a combustion air to a fueled supercharged reciprocating internal combustion engine (ICE), resulting in producing and delivering an on-demand power to the grid;
   recovering a cold thermal energy released in the cold box during said re-gasifying the liquid air for cryogenic cooling a LAES facility exhaust in the cold box, with capturing and liquefying at least a part of a carbon dioxide ($CO_2$) in said LAES facility exhaust formed by combustion of a fuel in said LAES facility to provide a liquid $CO_2$; and
   wherein the improvement comprises in combination:
   recovering the liquid $CO_2$;
   pumping said liquid $CO_2$ up to a pressure exceeding a pressure of the pumped liquid air to provide a pumped liquid $CO_2$;
   injecting the pumped liquid $CO_2$ into the re-gasified air, resulting in re-gasifying said pumped liquid $CO_2$ and forming a mixed air-$CO_2$ stream;
   superheating the mixed air-$CO_2$ stream in a waste heat recuperator installed upstream of a high-pressure (HP) expander of said expander train, wherein the HP expander is installed upstream of the ICE;
   partially expanding the mixed air-$CO_2$ stream in said HP expander to provide a pressurized mixed air-$CO_2$ stream upstream of the ICE;
   dividing the pressurized mixed air-$CO_2$ stream in a proportion according to a content of the components in said pressurized mixed air-$CO_2$ stream;
   delivering a major part of the pressurized mixed air-$CO_2$ stream to the ICE for combustion of the fuel in said ICE;
   releasing a pressurized exhaust gas from the ICE at an enhanced temperature;
   delivering a minor part of the pressurized mixed air-$CO_2$ stream through a pressure equalizer for mixing with the pressurized exhaust gas from the ICE, thus forming said LAES facility exhaust;
   increasing a temperature of the LAES facility exhaust through controlled burning of an additional fuel in said LAES facility exhaust;
   expanding the LAES facility exhaust in a low-pressure (LP) expander of said expander train, and subsequently recuperating a waste heat of said LAES facility exhaust recovered from said LP expander for the superheating the mixed air-$CO_2$ stream in the waste heat recuperator;
   multi-stage dewatering the LAES facility exhaust from the waste heat recuperator through deep cooling first by the LAES facility exhaust from the cold box and then by the re-gasified air prior to the injecting of the pumped liquid $CO_2$ into said re-gasified air;
   further cryogenic cooling the LAES facility exhaust in the cold box by the pumped liquid air, resulting in the re-gasifying of said pumped liquid air and de-sublimating at least a part of the $CO_2$ in the LAES facility exhaust to provide a de-sublimated $CO_2$ separated from said LAES facility exhaust;
   periodically fusing the de-sublimated $CO_2$ under a pressure exceeding one at the $CO_2$ triple point using an available waste heat stream from the LAES facility to provide the liquid $CO_2$;
   withdrawing and accumulating the liquid $CO_2$ for said pumping and injecting into the re-gasified air; and
   recovering a cold thermal energy of the LAES facility exhaust from the cold box for said deep cooling the LAES facility exhaust from the waste heat recuperator with subsequent removal of the LAES facility exhaust into atmosphere.

2. The method as in claim 1 wherein a minimal amount of the liquid $CO_2$ injected into the re-gasified air is equal to an amount of the $CO_2$ formed by combustion of the fuel in the LAES facility, and wherein a maximum amount of the liquid $CO_2$ injected into the re-gasified air does not exceed an amount of $CO_2$ at which an oxygen concentration in the mixed air-$CO_2$ stream at an inlet of the ICE achieves a lowest level for providing a stable combustion of the fuel in said ICE.

3. The method as in claim 2, wherein the maximum and minimum amounts of the liquid $CO_2$ injected into the re-gasified air are selected in a ratio from 2:1 to 4:1.

4. The method as in claim 3, wherein the maximum and minimum amounts of the liquid $CO_2$ injected into the re-gasified air are selected in a ratio from 2.5:1 to 3:1.

5. The method as in claim 2, wherein the liquid $CO_2$ is injected into the re-gasified air in an amount that provides a suppression of nitrogen oxides formation in the ICE, but not exceeding said maximum amount.

* * * * *